United States Patent [19]

Haraldsson et al.

[11] Patent Number: 5,721,400
[45] Date of Patent: Feb. 24, 1998

[54] SCALE WITH LEVER MECHANISM AND METHOD FOR MOUNTING COMPONENTS

[75] Inventors: Tore Östen Haraldsson; Tage Sören Haraldsson, both of Smålandsstenar, Sweden

[73] Assignee: EKS International AB, Smalandsstenar, Sweden

[21] Appl. No.: 409,196

[22] Filed: Mar. 23, 1995

[30] Foreign Application Priority Data

Mar. 24, 1994 [SE] Sweden .................................. 9401015

[51] Int. Cl.[6] .............................. G01G 21/08; G01G 3/00
[52] U.S. Cl. .......................... 177/256; 177/257; 177/225
[58] Field of Search .................................... 177/253, 256, 177/257, 260, 1, 225, 245, 264

[56] References Cited

U.S. PATENT DOCUMENTS

| | | | |
|---|---|---|---|
| 3,134,451 | 5/1964 | Hanssen | 177/225 |
| 3,193,034 | 7/1965 | Hutchinson et al. | 177/234 |
| 4,452,326 | 6/1984 | Hanssen et al. | 177/256 |
| 4,836,316 | 6/1989 | Carnevale et al. | 177/256 |
| 5,133,420 | 7/1992 | Smith | 177/256 |

FOREIGN PATENT DOCUMENTS

| | | |
|---|---|---|
| 208 622 | 11/1966 | Sweden . |
| 351 040 | 11/1972 | Sweden . |

Primary Examiner—Cassandra C. Spyrou
Assistant Examiner—Michael J. Hayes
Attorney, Agent, or Firm—Luedeka, Neely & Graham, P.C.

[57] ABSTRACT

A scale, especially a bathroom scale, comprises a base (10), a platform (11) and, arranged therebetween, a weighing mechanism comprising a U-shaped supporting bar (34) which is attached to the base (10) and supports indicating elements of the weighing mechanism. The mechanism also comprises two pairs of levers (12, 13) which support the platform (11). All four levers (12, 13) are at one end pivotally mounted on or in the vicinity of the corners of the base (10). The levers (12) of one pair of levers form a V-shaped lever part (15) by extending in V-shape from a plate (14) which is supported by a spring (30) included in the weighing mechanism, the spring being arranged on a longitudinally adjustable upright (31) resting against the base. The levers (13) of the other pair of levers are, at their end (21) operatively connected to the lever part, formed with a downwardly open recess (22) which rests against a corresponding, upwardly open recess (23) in the levers (12) of the lever part (15). When mounting the scale, the U-shaped supporting bar (34) is premounted with its indicating elements included in the weighing mechanism, the V-shaped lever part (15), the spring (30) included in the weighing mechanism and the associated longitudinally adjustable upright (31) are assembled to a unit, and the different parts of the base (10) are mounted in the succession: the U-shaped supporting bar (34), the lever part (15) and the two short levers (13).

13 Claims, 4 Drawing Sheets

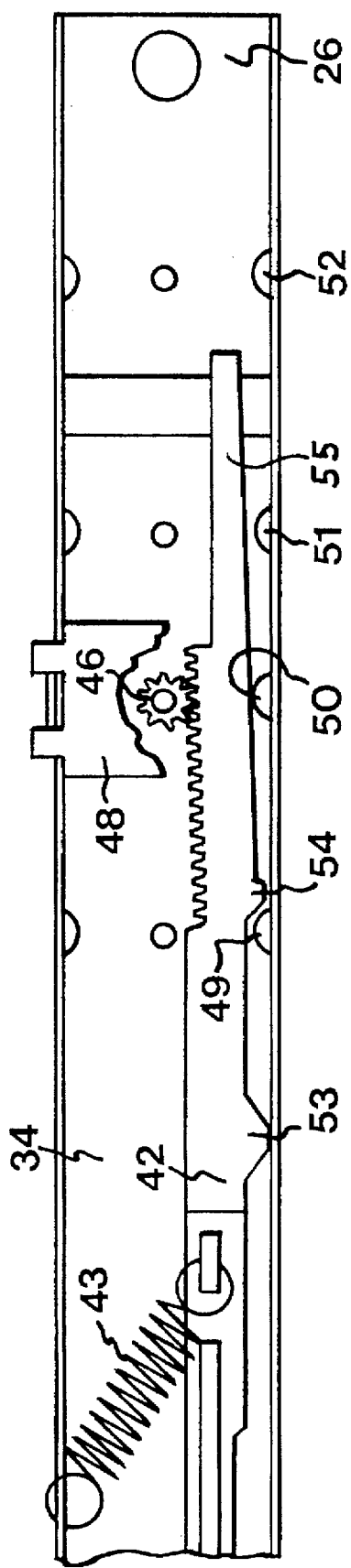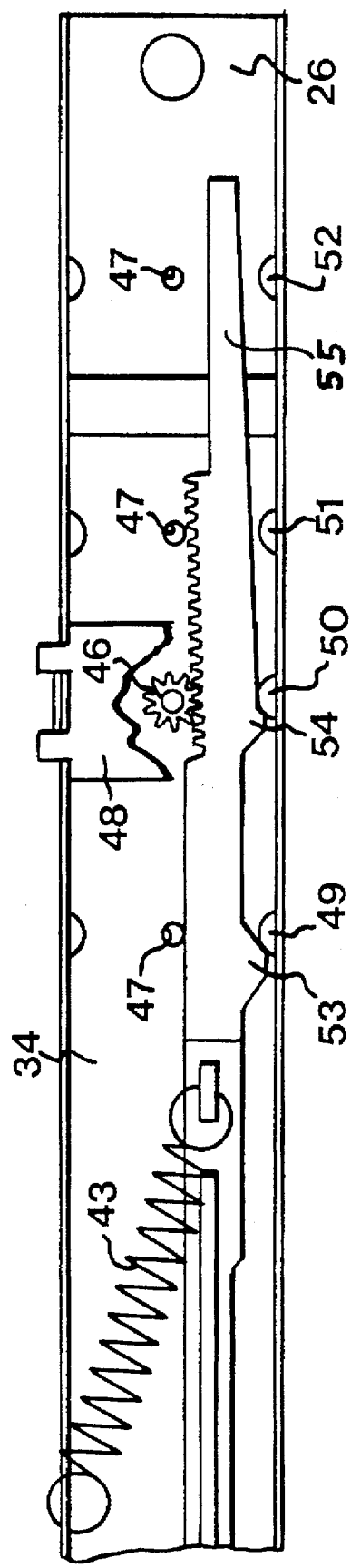

SCALE WITH LEVER MECHANISM AND METHOD FOR MOUNTING COMPONENTS

Scales, especially bathroom scales, of the mechanical type generally comprise a base and a platform and, arranged therebetween, a mechanical weighing mechanism or load-sensing mechanism with a spring which serves to take up the load on the platform and whose deformation depends on the size of the load. Moving parts of the mechanism then convert the spring deformation motion into a motion of an indicator, usually a rotatable pointer or disc, which may have an indicating scale for visually indicating the measured weight. Alternatively, the moving parts of the mechanism may cooperate with a sensor in order to indicate the result on a display.

In a most common type of mechanical scale (cf. SE-B-208,622 and SE-B-351,040) the spring and an adjusting mechanism therefor are arranged at the front edge of the base, which is essentially rectangular. The weighing mechanism in this type of scale comprises two pairs of levers. The platform is supported by these levers. In commercially available designs of these known scales, the platform rests on the levers by the intermediary of a carrier. The carrier has an upwardly directed point which engages the bottom of an indentation in the lower side of the platform. The carrier also comprises a downwardly directed knife edge by which the carrier rests against the bottom of the V-shaped recess in the lever in the vicinity of the lever end supported by an upwardly bent edge of the base or by an upright arranged on the base. The platform is kept pressed against the carriers and the base by means of mounting tension springs which are coupled to and extending between the platform and the base. This arrangement permits the platform to transmit forces to the levers with small frictional losses, thereby obtaining improved accuracy in weighing.

In the prior-art scales, two of the levers are at one end interconnected by means of a plate from which the levers extend obliquely outwards, thereby forming a V-shaped lever part. The other end of these levers is, as mentioned above, suspended from an upwardly bent edge or an upright on the base in two corners thereof. The plate is supported by the spring whose one end is attached to the plate and whose other end is arranged on the upper end of a longitudinally adjustable upright for zeroing or finely adjusting the scale. The lower end of the upright rests on the base so that it can perform limited pivoting movements in the longitudinal and transverse directions of the base.

The levers of the other pair of levers are shorter and are at one end, as mentioned above, also suspended from an upwardly bent edge or an upright on the base in the other two corners of the base. The other ends of the short levers are pivotally connected to the long levers of the V-shaped lever part in a position between the ends thereof, usually approximately half-way between the ends of the long levers. In all prior-art scales, the short and the long levers are interconnected by means of an annular hanger, which is slipped onto the long levers and is retained in an upwardly open notch therein. One example of this technique of transferring forces between the short and long levers is disclosed in U.S. Pat. No. 4,452,326 (5 Jun. 1984). The free end of the short levers has an essentially V-shaped notch in their downwardly directed edge and is inserted in the hanger such that the hanger rests in the V-shaped notch and the shorter levers are accommodated in the hanger under the long levers. In some prior-art scale constructions, counteracting knife edges are used also in this case, thereby reducing the frictional losses in the power transmission train from the platform to the base.

This type of weighing mechanism and power transmission train between platform and weighing mechanism functions excellently, but it has been found that the mounting thereof is complicated and, thus, expensive, among other things because mounting cannot be effected by automatics or robots without great difficulties. The same problem occurs also in the other parts of known weighing mechanisms of this type.

One object of the present invention therefore is to provide a new weighing mechanism which is based on the above-mentioned previous constructions but which can, in a simple manner and with success, be automatically mounted by means of robots. A further object is to provide, in such a weighing mechanism which is mountable by means of robots, a more reliable indication of the weighing result. One more object is to provide, in such a weighing mechanism which is mountable by means of robots, a more reliable function of the indicating mechanism and a reduction of the risks of faults occurring when subjecting the scale to overload.

According to the invention, these and other objects are achieved by a scale which is designed as stated in claim 1. Particularly preferred embodiments of the invention are defined in the subclaims.

Briefly, the invention thus relates to a scale, especially a bathroom scale, which has a bottom, a platform and, arranged therebetween, a mechanical weighing mechanism which comprises a U-shaped supporting bar attached to the base and supporting indicating elements of the weighing mechanism. The mechanism also comprises two pairs of levers which support the platform. All four levers are at one end pivotally mounted on or in the vicinity of the corners of the base. The levers of one lever pair form a V-shaped lever part by extending in V-shape from a plate which is supported by a spring included in the weighing mechanism, said spring being suspended from a longitudinally adjustable upright resting on the base. The levers of the other lever pair are, at their end operatively connected to the lever part, formed with a downwardly open recess which rests against a corresponding, upwardly open recess in the lever arms of the lever part. When mounting the scale, the U-shaped supporting bar is premounted with its indicating elements included in the weighing mechanism, the V-shaped lever part, the spring included in the weighing mechanism and the associated longitudinally adjustable upright are assembled to a unit, and the different parts of the base are mounted in the following succession: the U-shaped supporting bar, the lever part and the two short levers.

The invention and its advantages will now be described with reference to the accompanying drawings illustrating the embodiment of an inventive scale, which at present is preferred.

Figure 1:
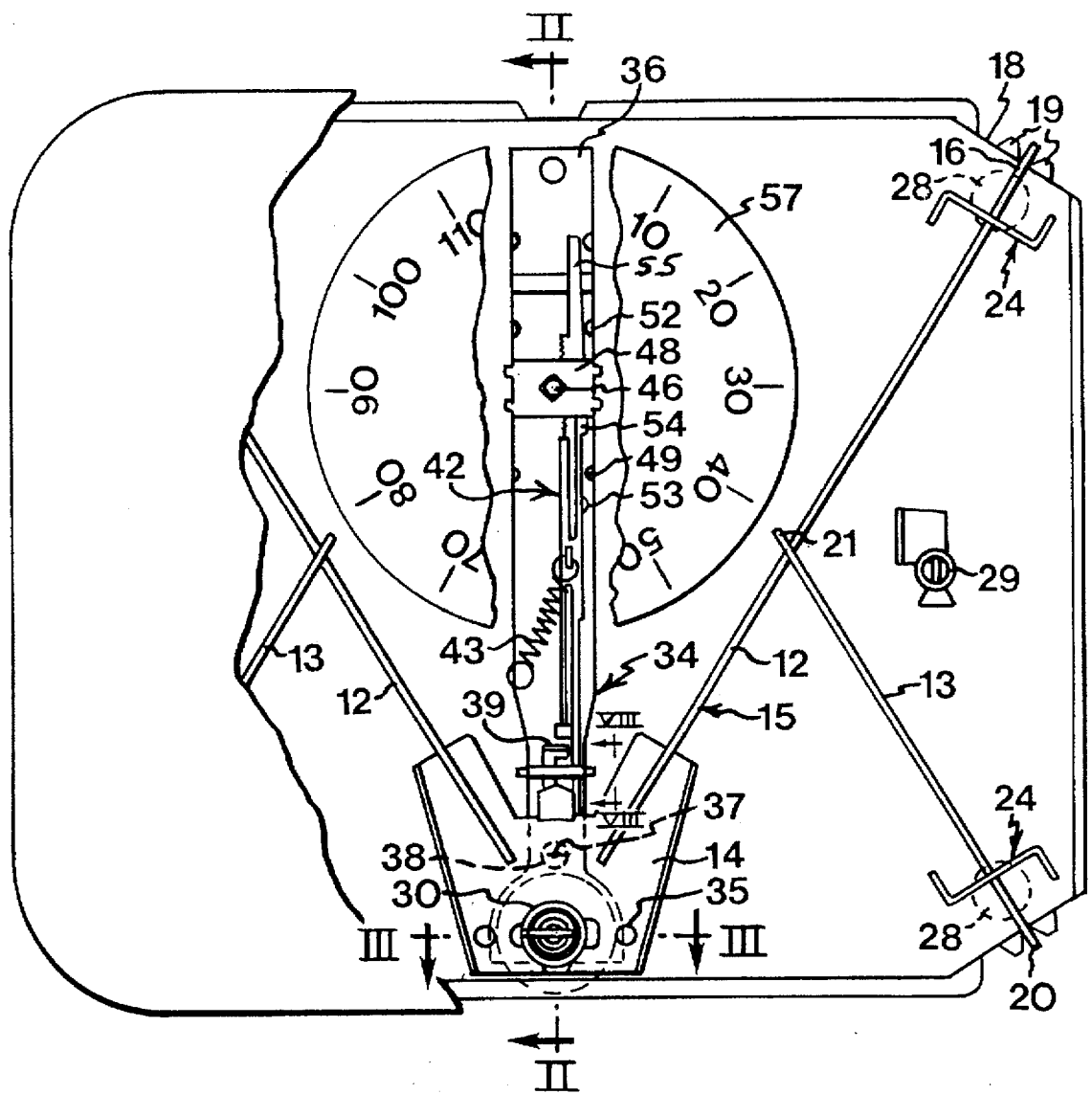
FIG. 1 is a partly sectional, top plan view of an embodiment of a scale according to the present invention.
Figure 3:
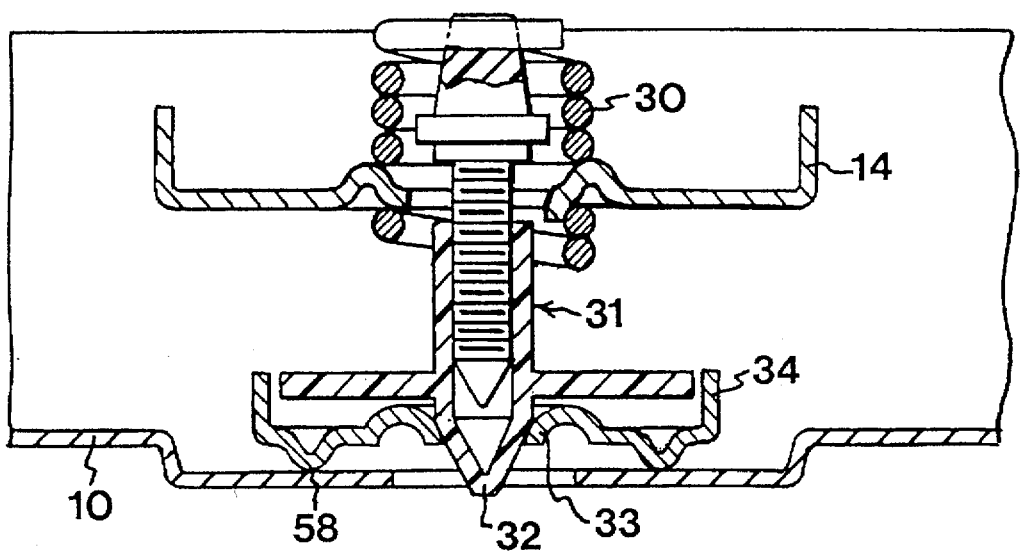

FIG. 3 a sectional view along line III—III of FIG. 1.

Figure 4:
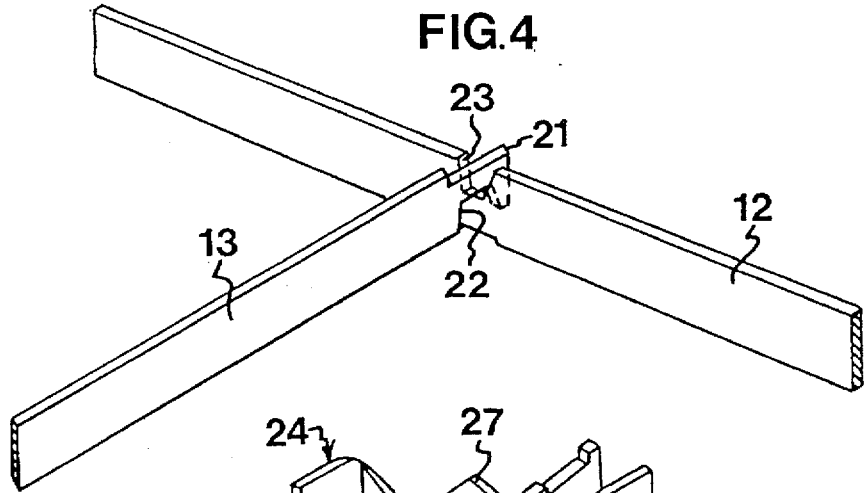

FIG. 4 is a perspective view of some components in FIG. 1.

FIG. 5 is a partly sectional, top plan view of parts of the scale illustrated in FIG. 1, in an unloaded FIG. 6 the same portion of the scale as FIG. 5, but in a heavily loaded state.

Figure 7:
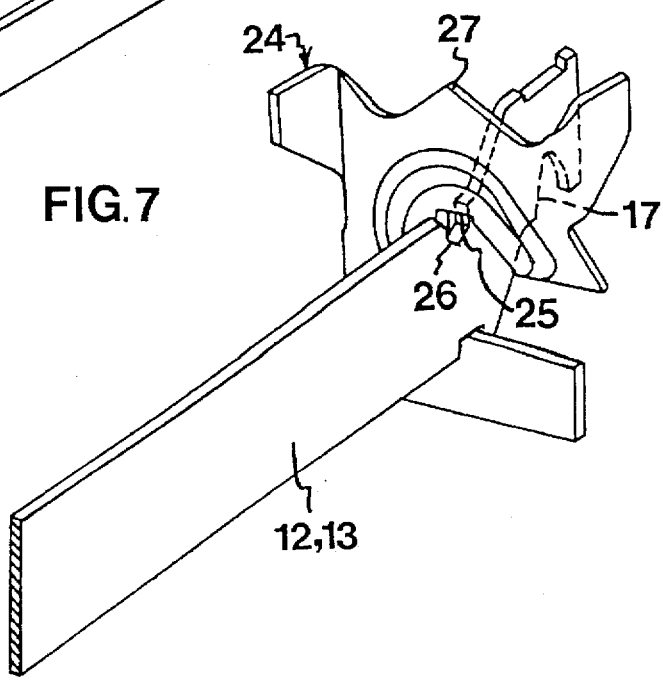

FIG. 7 illustrates a portion of a lever and a carrier mounted thereon.

Figure 8:
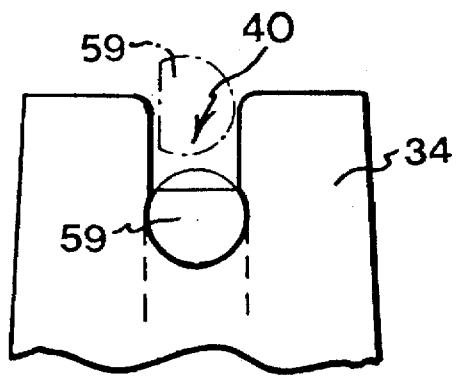

FIG. 8 is a sectional view along line VIII—VIII of FIG. 1.

The embodiment of the scale according to the present invention, as shown in the drawings, comprises in a prior-art manner a base 10 and a platform 11. Arranged therebetween is a weighing mechanism which comprises two pairs of levers 12, 13. The levers 12 are long and, at one end, rigidly connected to a plate 14 in order to form therewith a V-shaped lever part 15. The other end 16 of the long levers is in its lower side formed with a V-shaped recess 17 which rests on an upwardly bent edge 18 of the base 10. For lateral guiding of the lever, the upwardly bent edge 18 may have outwardly bent lugs 19 which restrict the lateral displacement of the lever. The lever may, however, also be arranged on the upper edge of uprights (not shown) extending from the base 10 inside the upwardly bent edge. One end 20 of the shorter levers 13 is formed with a V-shaped notch 17 by which these levers rest on the upwardly bent edge 18 of the base 10 or on an upright, corresponding to that applying to the longer levers 12.

According to the invention, the short and long levers are interconnected by the short levers 13 at their other end 21 being formed with a recess 22 in their lower side and by the long levers 12 being provided with an upwardly open recess 23 in their upper side.

All four levers 12, 13 are, in a prior-art manner, provided with a carrier 24 which by a downwardly directed knife edge 25 rests on the bottom of a V-shaped recess 26 in the lever 12, 13 adjacent the end supported by the upwardly bent edge 18 of the base 10. In FIG. 7, the carrier 24 is slightly raised from the lever 12, 13, thereby making it possible to distinguish the edge 25 and the recess 26. The carrier 24 has an upwardly directed point 27 against which the platform 11 rests by the bottom of a crater-shaped recess 28 as indicated by dashed lines in FIG. 1. The base 10 and the platform 11 are held together by means of tension springs 29 of which only one is shown.

The plate 14 on the V-shaped lever part 15 is supported by a spring 30 by one end of the spring being screwed into a recess in the plate and the other end of the spring being secured to an undercut groove at the other end of a longitudinally adjustable upright 31. The lower conical end 32 of the upright 31 rests against the edges of a conical indentation or recess 33 at one end of a U-shaped supporting bar 34. To permit adjustment of the length of the upright 31, it is composed of two parts which are screwed together, the lower part having an adjusting knob 35 which is accessible from the outside of the scale since it partially projects through the upwardly bent edge 18 of the base 10.

The U-shaped supporting bar 34 accommodates the indicating elements of the weighing mechanism and is attached to the base 10 at one end 36 only, whereas the other end rests against the base 10 by means of downwardly directed protuberances 58. For lateral guiding of the U-shaped supporting bar 34, an upwardly bent flap 37 on the base may extend through a hole 38 in the supporting bar.

Figure 2:
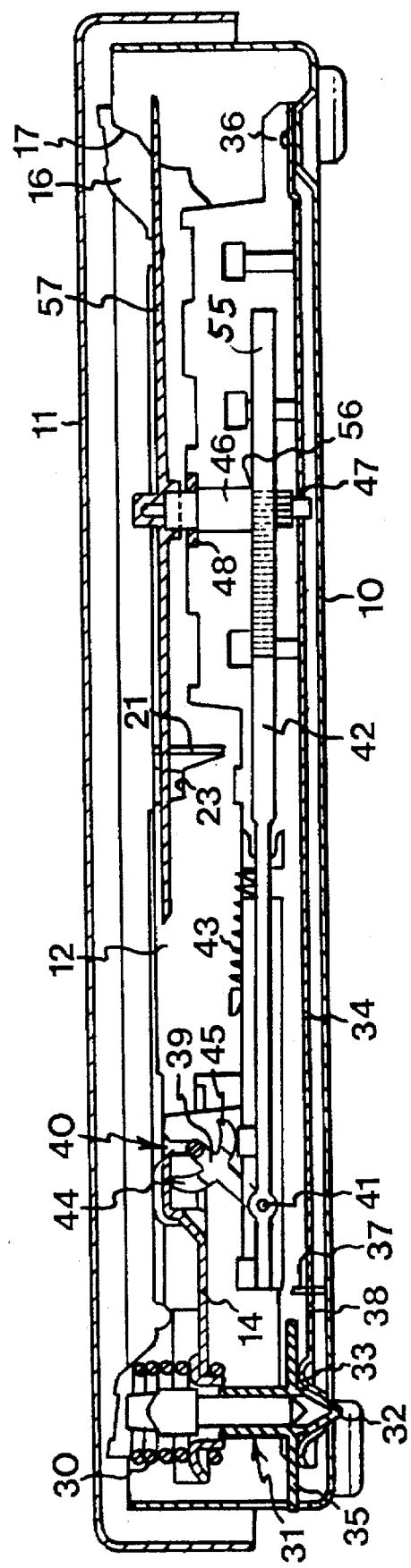
FIG. 2 is a sectional view along line II—II of FIG. 1.

The indicating elements of the weighing mechanism comprise a rocker arm 39 which is pivotally mounted in upwardly opening undercut grooves 40 in the side edges of the U-shaped supporting bar. To permit insertion of the shaft 59 of the rocker arm 39 into the grooves 40, this is bevelled to a circular segment, as shown in FIG. 8. This design of the shaft 59 and the grooves 40 implies that the rocker arm must be set in a rotary position which is pivoted through 90° relative to the normal position of use (resting position). This confers the great advantage that the shaft 59 cannot fall out of the grooves 40, if the scale is handled in a careless manner. The other end 41 of the rocker arm 39 is pivotally connected to a reciprocable rack 42 which is constantly biased to the left in respect of FIG. 2 by means of a tension spring 43 functioning as a return spring, one end thereof being attached to the U-shaped supporting bar 34 and the other end to the rack 42. The rocker arm 39 is formed with a projection 44 which, under the action of the tension spring 43, is pressed against the lower side of the plate 14 of the V-shaped lever part 15. As the plate 14 moves vertically when subjecting the scale to load, the rocker arm 39 will tilt about its mounting point at 40. To restrict the counterclockwise pivoting of the rocker arm as seen in FIG. 2, the rocker arm may have a second projection 45 which may be designed for engagement with the lower side of the plate 14, but in the illustrated embodiment this possibility is not utilized. The projection 45 may, however, also be used for engagement with the rack 42 in case of overloading of the scale.

The indicating elements of the weighing mechanism comprise, in addition to the rack 42, a pinion 46 whose lower end is mounted in an aperture 47 in the bottom of the supporting bar and whose upper end is mounted in a bearing bracket 48. The bearing bracket is, by means of a snap lock mechanism (not shown), attached to the upwardly bent web portions of the supporting bar 34. For guiding the rack 42 and maintaining safe meshing between the teeth of the rack and the pinion 46, the U-shaped supporting bar 34 is formed with protuberances 49-52 on the inside of the upwardly directed webs of the supporting bar. The protuberances 49-52 cooperate with projections 53, 54 and a guide surface 55 on the rack 42. When comparing FIGS. 5 and 6, the function of this locking device will be evident. FIG. 5 shows the scale in an unloaded state, while FIG. 6 shows the scale in a heavily overloaded state. In the unloaded state, the rack 42 is kept retracted to the left under the action of the spring 43. In this position, the shoulder 54 may possibly engage the protuberance 49. The rack rests against at least one of the shoulders 50-52 by its guide surface 55. It is preferred that the guide surface 55 is held at an angle relative to the path of motion of the rack 42, of for example 2°, which thereby meshes with only one protuberance 50 during displacement of the rack. As the scale is subjected to load, the rack 42 is moved to the right, the meshing pressure between the teeth of the rack and the pinion 46 increasing owing to the inclination of the guide surface 55 and the engagement thereof with the protuberance 50. The meshing pressure becomes higher, the more the scale is loaded. In case of heavy overload, the motion of the rack to the right as seen in FIG. 6 is stopped by engagement of the projections 53, 54 of the rack with the protuberances 49, 50. If, however, the scale is suddenly released from its load, the motion of the rack to the right as seen in FIG. 5 may be stopped by engagement of the shoulder 54 of the rack with the protuberance 49. For guiding the rack also in vertical direction, the pinion 46 may have a thickened portion forming an abutment surface 56 which limits the motions of the teeth in the vertical direction of the pinion 46. The pinion 46 is in a prior-art manner connected to an indicating scale 57, whose angular deviation indicates the weighing result. This may in a prior-art manner be read through a window (not shown) in the upper side of the platform.

In the preferred embodiment of the inventive scale, the rack can be turned and arranged on the other side of the pinion, if this is required by the selected indicating mechanism. Moreover, racks of different lengths may be used, the bearing bracket 48 and the pinion being moved to other positions along the supporting bar 34 as indicated by the series of apertures 47 (see FIG. 6).

By the preferred embodiment of the invention, as described above, the weighing mechanism has been designed for adaptation to automatic mounting of the components. In the method of mounting the scale, which at present is preferred, the U-shaped supporting bar 34 is premounted with its weighing mechanism components (rocker arm, rack, tension spring, pinion and bearing bracket). Correspondingly, the V-shaped lever part 15 is assembled with the spring 30 and the longitudinally adjustable upright 31 to form a unit. Also the carriers 34 are mounted on their respective levers. In automatic mounting, a robot may thus first place the U-shaped supporting bar and the components included therein in the base and automatically rivet or in some other manner fix the supporting bar end 36 to the base such that the flap 37 projects through the hole 38. Subsequently, the lever part 15 with parts attached thereto is mounted, the upright 31 being guided to a correct position by the design of the hole 33 at the opposite end of the supporting bar 34. The levers 13 with the carriers 24 mounted can then readily be positioned by means of a robot, whereupon the platform is mounted and the scale is assembled by mounting of the springs 29. This mounting of the springs 29 can be carried out manually or automatically, depending on the design of the springs. A possible design of the springs for automatic mounting is disclosed in U.S. Pat. No. 5,219,030.

The design of the scale also yields a more reliable indication by the possibility of premounting the components included in the weighing mechanism in the U-shaped supporting bar 34 and by ensuring the meshing of the rack 42 with the pinion 46, and the engagement of the rocker arm shaft 59 with the undercut grooves 40 even in careless loading and utilization of the scale. Furthermore, the same design of the components yields a more reliable function and a reduction of faults in case of overloading, since overloading of a prior-art scale may imply that the meshing of the rack 42 with the pinion 46 changes by the teeth skipping each other.

We claim:

1. A scale comprising a base, a platform and a mechanical weighing mechanism arranged between said base and said platform, said weighing mechanism comprising two pairs of levers supporting said platform, the levers of one lever pair being relatively long and the levers of the other lever pair being relatively short, said relatively long levers having one end of each lever rigidly connected to a plate to form a V-shaped lever part and a free end of each lever pivotally suspended from a supporting edge on said base, said plate being supported by a spring included in said weighing mechanism, one end of said spring being attached to said plate and the other end of said spring being connected to an upper end of a longitudinally adjustable upright which serves to zero or finely adjust said scale and which at its lower end rests on said base, said relatively short lever pair having one end of each suspended from a supporting edge on said base, each of said short levers having a recessed edge in a lower side at the other end thereof for pivotally connecting said edge of the short lever to an edge of an upwardly open recess formed in the upper side of each long lever at a position between the ends of the long lever, said weighing mechanism further comprising a U-shaped supporting bar which is attached to said base on one end thereof and which supports indicating elements of said weighing mechanism.

2. A scale according to claim 1 wherein said supporting edges comprise upwardly bent edges on said base.

3. A scale according to claim 1 wherein said supporting edges comprise upper edges of uprights arranged on said base.

4. The scale according to claim 1 wherein said U-shaped supporting bar extends essentially from the front edge of said base to the rear edge of said base, is attached to said base at the rear edge thereof and rests against said base at the front edge thereof.

5. The scale according to claim 4 wherein said supporting bar comprises an essentially conical indentation or recess at the end adjacent the front edge of said base and said longitudinally adjustable upright has a lower pointed end opposite the upper end thereof which rests against the edges of said conical indentation or recess.

6. The scale according to claim 1 wherein said U-shaped supporting bar comprises a rocker arm cooperating with said plate of said V-shaped lever part, said rocker arm being pivotally mounted in said supporting bar and operatively connected to a rack which is reciprocable in a longitudinal direction along said supporting bar, said rack meshing with a pinion mounted in said supporting bar for driving the indicator of said scale and being connected to a return spring, wherein said pinion is rotatably mounted at one end in an aperture in said supporting bar and at the other end is rotatably mounted in a transverse bearing bracket attached to said supporting bar.

7. The scale according to claim 6 wherein said rack and said supporting bar comprise interacting projections and guide surfaces which are arranged such that, when subjecting the platform to high loads, said rack is subjected to an increased force pressing said rack against said pinion.

8. A method for mounting a scale comprising a base, a platform and a mechanical weighing mechanism arranged between said base and said platform, wherein said weighing mechanism comprises two pairs of levers supporting said platform, the levers of one lever pair being relatively long and the levers of the other lever pair being relatively short, said relatively long levers having one end of each lever rigidly connected to a plate to form a V-shaped lever part and a free end of each lever pivotally suspended from a supporting edge on said base, said plate being supported by a spring included in said weighing mechanism, one end of said spring being attached to said plate and the other end of said spring being connected to an upper end of a longitudinally adjustable upright which serves to zero or finely adjust said scale and which at its lower end rests on said base, said relatively short lever pair having one end of each suspended from a supporting edge on said base, each of said short levers having a recessed edge in a lower side at the other end thereof for pivotally connecting said edge of said short lever to an edge of an upwardly open recess formed in the upper side of each long lever at a position between the ends of the long lever, said weighing mechanism further comprising a U-shaped supporting bar which is attached to said base on one end thereof and which accommodates indicating elements of said weighing mechanism, said method comprising the steps of premounting said V-shaped lever part, spring, and logitudinally adjustable upright of said weighing mechanism in said U-shaped supporting bar and connecting the recessed edges in the lower sides of said short levers to the edges of the upwardly open recesses formed in the upper side of said long levers and mounting said weighing mechanism in said base.

9. The method according to claim 8 wherein said supporting edges comprise upwardly bent edges on said base and said long and short levers are supported by mounting the levers on said upwardly bent edge.

10. The method according to claim 8 wherein said supporting edges comprise upper edges of uprights arranged on said base and said long and short levers are supported by mounting the levers on said upper edges of said uprights.

11. The method according to claim 8 wherein said U-shaped supporting bar extends essentially from the front edge of said base to the rear edge of said base further comprising fixedly attaching said U-shaped bar to said base at the rear edge of said base.

12. The method according to claim 11 wherein said supporting bar comprises an essentially conical indentation or recess at the end adjacent the front edge of said base and said longitudinally adjustable upright has a lower pointed end opposite the upper end thereof further comprising resting said pointed end of said upright against the edges of said conical indentation or recess.

13. The method according to claim 8 wherein said U-shaped supporting bar comprises a rocker arm cooperating with said plate of said V-shaped lever part, further comprising pivotally mounting said rocker arm in said supporting bar and operatively connecting said rocker arm to a rack which is reciprocable in a longitudinal direction along said supporting bar such that said rack meshes with a pinion mounted in said supporting bar for driving the indicator of said scale and said rack is connected to a return spring and rotatably mounting said pinion at one end in an aperture in said supporting bar and at the other end in a transverse beating bracket attached to said supporting bar.

* * * * *

UNITED STATES PATENT AND TRADEMARK OFFICE
CERTIFICATE OF CORRECTION

PATENT NO. :  5,721,400
DATED      :  February 24, 1998
INVENTOR(S) : Tore Östen Haraldsson & Tage Sören Haraldsson It is certified that error appears in the above-indentified patent and that said Letters Patent is hereby corrected as shown below:

Column 2, line 59, after "unloaded" insert -- state --

Column 2, line 60, after "Fig. 6" insert -- shows --

Column 6, Claim 6, line 19, change "beating" to -- bearing --

Column 6, Claim 9, line 61, change "edge" to --edges --

Signed and Sealed this

Twelfth Day of May, 1998

Attest:

BRUCE LEHMAN

Attesting Officer

Commissioner of Patents and Trademarks